United States Patent
Krapf

(10) Patent No.: US 9,594,185 B2
(45) Date of Patent: Mar. 14, 2017

(54) HAND-HELD LOCATING APPLIANCE AND A METHOD OF LOCATING OBJECTS WITH THE HAND-HELD LOCATING APPLIANCE

(71) Applicant: Robert Bosch GmbH, Stuttgart (DE)

(72) Inventor: Reiner Krapf, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 158 days.

(21) Appl. No.: 14/387,140

(22) PCT Filed: Jan. 23, 2013

(86) PCT No.: PCT/EP2013/051209
§ 371 (c)(1),
(2) Date: Sep. 22, 2014

(87) PCT Pub. No.: WO2013/139503
PCT Pub. Date: Sep. 26, 2013

(65) Prior Publication Data
US 2015/0042317 A1 Feb. 12, 2015

(30) Foreign Application Priority Data
Mar. 22, 2012 (DE) .................... 10 2012 204 580

(51) Int. Cl.
*G01V 3/15* (2006.01)
*G01V 11/00* (2006.01)
*G01S 13/06* (2006.01)

(52) U.S. Cl.
CPC .............. *G01V 11/00* (2013.01); *G01S 13/06* (2013.01); *G01V 3/15* (2013.01)

(58) Field of Classification Search
CPC ............ G01V 3/15; G01V 11/00; G01S 13/06
(Continued)

(56) References Cited

U.S. PATENT DOCUMENTS 5,361,029 A * 11/1994 Rider ................... G01R 31/023
324/326
5,969,528 A 10/1999 Weaver
(Continued)

FOREIGN PATENT DOCUMENTS

DE 10 2008 054 558 A1 6/2010
EP 1 298 457 A1 4/2003
(Continued)

OTHER PUBLICATIONS

International Search Report corresponding to PCT Application No. PCT/EP2013/05129, mailed May 10, 2013 (German and English language document) (7 pages).

*Primary Examiner* — Jay Patidar
(74) *Attorney, Agent, or Firm* — Maginot, Moore & Beck LLP

(57) ABSTRACT

A hand-held locating device for locating locatable objects includes a computational unit. The computational unit includes a first locating apparatus and at least one second locating apparatus. The first location apparatus is configured to locate a first subset of the locatable objects in a first locating region. The at least second locating apparatus is configured to locate a second subset of the locatable objects in a second locating region. The computational unit is configured to determine at least one piece of locating information for at least one locatable object of the locatable objects on the basis of a first locating result from the first locating apparatus and a second locating result from the second locating apparatus.

12 Claims, 6 Drawing Sheets

(58) Field of Classification Search
USPC .......................................... 324/326–329, 67
See application file for complete search history.

(56) References Cited

U.S. PATENT DOCUMENTS

| | | | | |
|---|---|---|---|---|
| 6,822,429 B2* | 11/2004 | Golder | ..................... | G01V 3/15 |
| | | | | 324/329 |
| 6,954,072 B1* | 10/2005 | Schlapp | ................... | G01V 3/15 |
| | | | | 324/329 |
| 2005/0156600 A1* | 7/2005 | Olsson | ..................... | G01S 7/03 |
| | | | | 324/329 |
| 2009/0128156 A1* | 5/2009 | Li | ........................ | G01R 29/085 |
| | | | | 324/326 |
| 2014/0218036 A1* | 8/2014 | Fry | ....................... | G01V 3/165 |
| | | | | 324/329 |

FOREIGN PATENT DOCUMENTS

| | | |
|---|---|---|
| EP | 2 196 828 A1 | 6/2010 |
| WO | 2007/147199 A1 | 12/2007 |

\* cited by examiner

A - A

HAND-HELD LOCATING APPLIANCE AND A METHOD OF LOCATING OBJECTS WITH THE HAND-HELD LOCATING APPLIANCE

This application is a 35 U.S.C. §371 National Stage Application of PCT/EP2013/051209, filed on Jan. 23, 2013, which claims the benefit of priority to Serial No. DE 10 2012 204 580.5, filed on Mar. 22, 2012 in Germany, the disclosures of which are incorporated herein by reference in their entirety.

BACKGROUND

A hand-held locating appliance having a computation unit, having a first locating apparatus, which is provided for the purpose of locating a locatable object at least in a first locating region, and having at least one second locating apparatus, which is provided for the purpose of locating a locatable object in at least one second locating region, has already been proposed.

SUMMARY

The disclosure is based on a hand-held locating appliance having a computation unit, having a first locating apparatus, which is provided for the purpose of locating a locatable object at least in a first locating region, and having at least one second locating apparatus, which is provided for the purpose of locating a locatable object in at least one second locating region, which, in particular, differs at least in part from a first locating region.

It is proposed that the computation unit is provided for the purpose of determining at least one piece of location information for at least one of the locatable objects at least on the basis of a locating result from the first locating apparatus and a locating result from the second locating apparatus. In particular, a "computation unit" is intended to be understood to mean a unit having an information input, an information processing section and an information output section. Advantageously, the computation unit has at least a processor, a memory, input and output means, an operating program and/or computation routines. Preferably, the parts of the computation unit are arranged on a common board and/or are advantageously arranged in a common housing. Advantageously, the computation unit is in the form of a microprocessor. In particular, a "locating apparatus" is intended to be understood to mean an apparatus that, during operation, particularly transmits a locating signal and/or advantageously receives a component of the locating signal that is reflected by the locatable object, in particular. In particular, the locating apparatus outputs at least one, in particular electrical, parameter that is dependent at least on the received locating signal and that advantageously transports the locating result to the computation unit. In particular, the locating apparatus determines at least whether a locatable object is situated in a locating region of the locating apparatus. Advantageously, the parameter has at least the locating information about a position of the locatable object relative to the locating apparatus. Particularly advantageously, the locating apparatus determines at least one distance between the locating apparatus and the locatable object. In particular, "provided" is intended to be understood to mean particularly specifically programmed, designed and/or equipped. In particular, a "locatable object" is intended to be understood to mean a part that is in a concealed arrangement in a workpiece, for example in a wall, and that has at least one electromagnetic property that differs from that of the workpiece, for example a power line, a water conduit, a support, a wooden beam and/or a piece of reinforcing ironwork. Preferably, the locatable object is in a spaced arrangement from the locating apparatus during locating. In particular, a "locating region" is intended to be understood to mean a region in which the locating apparatus transmits the locating signal and/or advantageously from which the locating apparatus receives the locating signal. Preferably, an antenna gain of the locating antenna varies by less than 20 dB, particularly preferably less than 10 dB, in the direction of the locating region in one operating state and/or a plurality of operating states. In particular, a locating range of the locating apparatus is less than 100 cm, advantageously less than 20 cm. In particular, the expression "a second locating region that differs at least in part from the first locating region" is intended to be understood to mean that the second locating apparatus is provided for the purpose of locating a locatable object in a portion of the locating region that is arranged outside a locating region of the first locating apparatus. Preferably, the locating region of the second locating apparatus is larger than the locating region of the first locating apparatus. Advantageously, the first locating apparatus and the second locating apparatus are provided for the purpose of locating in different directions in at least one operating state. A "piece of locating information" is intended to be understood to mean particularly a piece of object information that describes an arrangement of the locatable object relative to the locating apparatus and particularly relative to the hand-held locating appliance. In particular, the locating information describes at least one interval between the locatable object and the locating apparatus. Preferably, the computation unit determines, particularly besides the interval, at least one piece of information concerning the direction in which the locatable object is arranged relative to the locating apparatus. Particularly advantageously, the locating information has at least one piece of information about an, in particular quantitative, interval between the locating apparatus and the locatable object in a direction parallel to a surface of the workpiece. A "piece of object information" is intended to be understood to mean a piece of information that appears useful to a person skilled in the art and that is dependent on the locatable object, but preferably a piece of locating information, a piece of profile information, a piece of property information and/or a piece of plausibility information. Preferably, the computation unit reports the object information for output to an operator. In particular, the computation unit determines whether the locatable object is arranged centrally and/or eccentrically in front of the locating apparatus. Preferably, the computation unit determines whether the locatable object is arranged centrally, to the left and/or to the right of the main direction of radiation of the locating apparatus. Particularly advantageously, the computation unit determines whether the locatable object is arranged centrally, to the left of, to the right of, above and/or below the main direction of radiation of the locating apparatus. Preferably, the computation unit determines an angle by which the locatable object is arranged relative to the main direction of radiation of the locating apparatus. In particular, "centrally in front of the locating apparatus" is intended to be understood to mean that the locatable object is arranged at least to some extent on a straight line that is oriented at right angles to an appliance outer side—facing the locatable object—of the hand-held locating appliance and that intersects the appliance outside. The directions "to the left, to the right, above and below" are dependent particularly on an ergonomy of the hand-held locating appliance. Preferably, an operator control unit of the hand-held locating appliance is arranged below a display unit of the hand-held locating appliance. A "locating result" is intended to be understood to mean particularly a piece of information that is dependent on the locatable object and that ascertains precisely one of the locating apparatuses, in particular. Preferably, the locating result from the first locating apparatus is independent of the locating result from the second locating apparatus. Preferably, the first locating apparatus and the second locating apparatus are at least to some extent of separate design. In particular, the expression "determine on the basis of a locating result from the first locating apparatus and a locating result from the second locating apparatus" is intended to be understood to mean that the computation unit logically combines the locating results from the locating apparatuses with one another and advantageously ascertains at least one piece of object information that is indeterminable from the locating result from a single locating apparatus. The inventive refinement of the hand-held locating appliance allows a high level of accuracy and/or advantageously a high level of reliability to be achieved at least for determination of the location of the locatable object and particularly also for determination of a piece of property information. In particular, it is possible to achieve particularly high selectivity for location determination.

Furthermore, it is proposed that the first locating apparatus is provided for the purpose of locating in at least a first and a second locating subregion of the first locating region separately, which allows a position of the locatable object to be specified particularly accurately. Preferably, the locating apparatus is provided for the purpose of locating in at least two locating subregions, advantageously in at least three locating subregions, particularly advantageously in at least five locating subregions, separately. Alternatively, the locating apparatus could have smoothly adjustable locating subregions. "Different at least to some extent" is intended to be understood to mean particularly that the locating subregions of a single locating apparatus overlap by less than 50%, advantageously less than 20%, particularly advantageously less than 10%. "Locating subregions" is intended to be understood to mean particularly a subregion of the locating region. The expression "locate separately" is intended to be understood to mean particularly that the locating apparatus is provided for the purpose of performing a locating operation in the two locating subregions independently of one another. Preferably, the locating apparatus locates in one of the locating subregions in one operating state and in another of the locating subregions in another operating state.

In addition, it is proposed that the second locating apparatus is provided for the purpose of locating in at least a first and a second locating subregion of the second locating region separately, which allows a position of a locatable object and of a plurality of locatable objects to be specified particularly accurately.

In addition, it is proposed that the computation unit is provided for the purpose of outputting the location information for at least one of the locatable objects in one operating state only if the at least two, advantageously three or particularly advantageously four, locating apparatuses each sense the locatable object, which allows locating errors to be avoided. The expression if "the at least two locating apparatuses each sense the locatable object" is intended to be understood to mean particularly that the computation unit outputs the location information if the first locating apparatus receives a detectable locating signal reflected by the locatable object and at least the second locating apparatus receives a detectable locating signal reflected by the locatable object.

In addition, it is proposed that the computation unit is provided for the purpose of determining at least one piece of profile information for at least one of the locatable objects at least on the basis of a locating result from the first locating apparatus and a locating result from the second locating apparatus, which advantageously allows a piece of information about a profile of the locatable object to be output to an operator. In particular, a "piece of profile information" is intended to be understood to mean a piece of information that describes a profile of at least one main directional extent of an elongate locatable object at least in a locating region of the locating apparatus relative to the locating apparatus. Advantageously, the profile information has a piece of information about a shape of the locatable object. For example, the profile information could state that the elongate locatable object runs from the left under the hand-held locating appliance to the right from the point of view of the operator.

In addition, it is proposed that the first locating apparatus is provided for the purpose of locating at least one of the locatable objects using a first type of locating that differs from a second type of locating by the second locating apparatus, which also allows different kinds of locatable objects to be located particularly accurately. A "type of locating" is intended to be understood to mean particularly a physical principle that the locating apparatus uses to locate the locatable object. Preferably, the type of locating is in the form of inductive locating, in the form of capacitive locating, in the form of radar locating and/or in the form of AC voltage locating. "Inductive locating" is intended to be understood to mean particularly locating in the case of which the locating apparatus uses a magnetic field, particularly set up by a coil, to locate the locatable object, specifically advantageously using differently magnetized permeabilities of the workpiece and of the locatable object. The inductive locating advantageously allows metallic locatable objects to be located, such as reinforced steel, screws and/or lines in a wall. "Capacitive locating" is intended to be understood to mean particularly locating in the case of which the locating apparatus uses an electrical field, particularly set up by a capacitor plate, to locate the locatable object in the workpiece, specifically advantageously using differently dielectric conductivities of the workpiece and of the locatable object. Furthermore, the computation unit is provided for the purpose of determining a piece of information about a material type of at least the locatable object from the locating result from the capacitive locating of the locating apparatus. The capacitive locating advantageously allows nonmetallic locatable objects to be located, such as wooden beams and/or cavities in a wall. "Radar locating" is intended to be understood to mean particularly locating in the case of which the locating apparatus uses a radio-frequency electromagnetic field emitted by an antenna to locate the locatable object, specifically advantageously using different electromagnetic permittivities of the workpiece and of the locatable object. Preferably, the locating apparatus performs radar locating by transmitting a locating signal that has a bandwidth of more than 500 MHz, advantageously more than 1 GHz, particularly advantageously more than 2 GHz. Alternatively, the locating apparatus could transmit a narrowband locating signal. The radar locating advantageously allows metallic and nonmetallic locatable objects to be located particularly accurately. "AC voltage locating" is intended to be understood to mean particularly locating that locates an electrical voltage using a signal that is emitted by an AC power line and/or by a plurality of AC power lines and that has a frequency of 50 Hz or 60 Hz, in particular. Preferably, for AC voltage locating, the locating apparatus has a locating region having precisely one locating subregion. Alternatively, for the purpose of AC voltage locating, the locating apparatus could have a locating region having a plurality of locating subregions. The AC voltage locating allows live power cables to be advantageously located.

In one advantageous form of the disclosure, it is proposed that the computation unit is provided for the purpose of determining at least one piece of property information for at least one of the locatable objects at least on the basis of a locating result from the first locating apparatus and a locating result from the second locating apparatus, which allows the property information to be associated with one locatable object, particularly when a plurality of locatable objects are arranged in different locating regions. A "piece of property information" is intended to be understood to mean a piece of information that describes at least a material property, a material type and/or a material state of the locatable object. In particular, "material property" is intended to be understood to mean a physical property of the locatable object. "Determine a material type" is intended to be understood to mean particularly that the computation unit determines at least a piece of information that is associated with a material type, for example wood, iron, copper and/or stone.

Furthermore, it is proposed that the computation unit is provided for the purpose of determining at least one piece of plausibility information at least on the basis of a locating result from the first locating apparatus and a location result from the second locating apparatus, which allows implausible locating operations to be identified and advantageously rejected or marked. A "piece of plausibility information" is intended to be understood to mean particularly a piece of information that describes a credibility of the object information. Preferably, the plausibility information states whether a first piece of object information matches a second piece of object information. For example, the plausibility information could state that AC voltage locating has found an electrical voltage, but inductive locating has not found any metallic locatable objects. Furthermore, the plausibility information could state that a first locating apparatus has found a metallic locatable object only in a first region and a second locating apparatus has found an AC voltage only in a second region, which is different than the first region, with the computation unit assigning the plausibility information a value that denotes the locating results from the locating apparatuses as implausible.

In addition, it is proposed that the computation unit is provided for the purpose of weighting at least the locating result from the first locating apparatus and the locating result from the second locating apparatus differently, which allows a high level of accuracy and reliability to be achieved for the determination of the locating result. In particular, the expression "weighed differently" is intended to be understood to mean that the computation unit compares the locating results from the first and second locating apparatuses prior to an output, with the computation unit outputting the locating result from the locating apparatus with the higher weighting in the event of inconsistencies. Preferably, the locating apparatus has a higher weighting that has higher reliability for the locating, particularly on the basis of a piece of property information.

In addition, it is proposed that the computation unit is provided for the purpose of performing different weightings for the locating results of the first and second locating apparatuses in different modes of operation, which allows a measurement for which the mode of operation is optimized to be performed particularly accurately and reliably. The expression "perform different weightings in different modes of operation" is intended to be understood to mean particularly that the computation unit provides a locating result from the first locating apparatus with a higher weighting in one operating state and provides a locating result from the other locating apparatus with a higher weighting in another operating state. The modes of operation can advantageously be selected and in particular configured by the operator. In particular, the modes of operation are in the form of modes of operation that appear useful to a person skilled in the art, but advantageously in the form of a wood locating mode, in the form of a metal locating mode, in the form of a power cable locating mode, in the form of a cavity locating mode and/or in the form of a fine searching mode. In this case, the locating results are weighted in a manner that appears useful to the person skilled in the art, but preferably on the basis of a locating subregion of the locating apparatuses, a locating region and/or advantageously a locating type.

BRIEF DESCRIPTION OF THE DRAWINGS

Further advantages can be found in the description of the drawing below. The drawing shows four exemplary embodiments of the disclosure. The drawing, the description and the claims contain numerous features in combination. A person skilled in the art will expediently also consider the features individually and will combine them into useful further combinations.

In the drawing.

DETAILED DESCRIPTION

Figure 1:
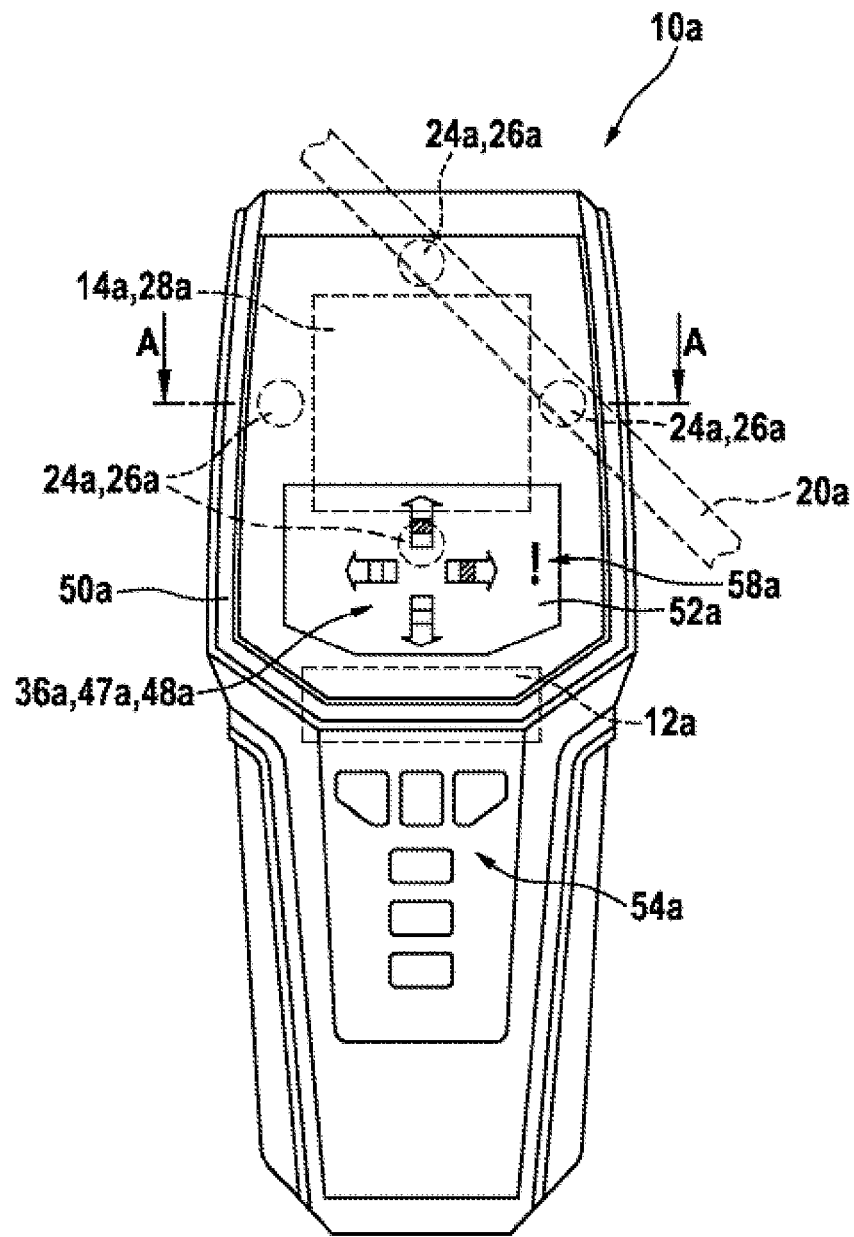
FIG. 1 shows an inventive hand-held locating appliance with a computation unit and four locating apparatuses that have different locating regions.
Figure 2:
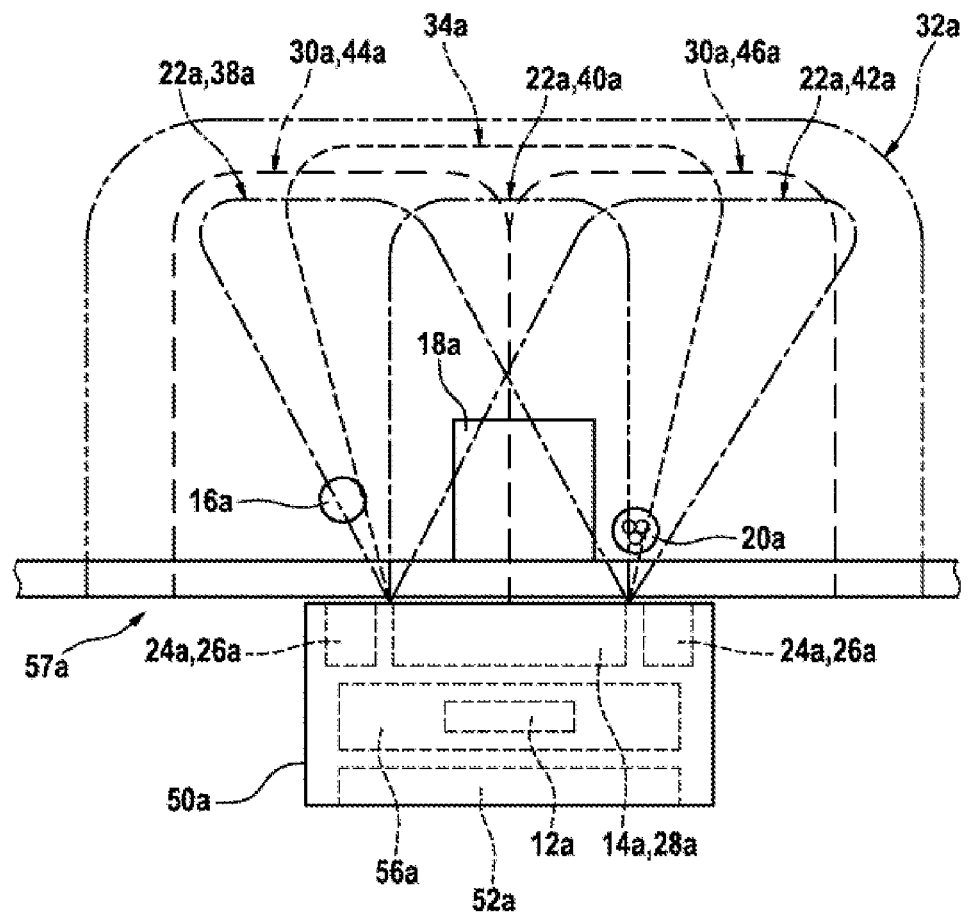
FIG. 2 shows a schematic section through the hand-held locating appliance from FIG. 1 and locatable objects.

FIG. 1 and FIG. 2 show a hand-held locating appliance 10a with a computation unit 12a, a first locating apparatus 14a, a second locating apparatus 24a, a third locating apparatus 26a and a fourth locating apparatus 28a. Furthermore, the hand-held locating appliance 10a comprises an appliance housing 50a, a display unit 52a, an operator control unit 54a and an appliance electronics unit 56a. The locating apparatuses 14a, 24a, 26a, 28a are provided for the purpose of locating locatable objects 16a, 18a, 20a that are in a concealed arrangement in a workpiece 57a during operation in locating regions 22a, 30a, 32a, 34a that are each different to some extent. In this case, the workpiece 57a is in the form of a wall. The computation unit 12a, the locating apparatuses 14a, 24a, 26a, 28a and the appliance electronics unit 56 are arranged in an interior of the appliance housing 50a. An operator grips and guides the appliance housing 50a during a locating operation. The display unit 52a and the operator control unit 54a are arranged on a side of the appliance housing 50a that is averted from the locating regions 22a, 30a, 32a, 34a. The four locating apparatuses 14a, 24a, 26a, 28a are provided for the purpose of locating at least the locatable objects 16a, 18a, 20a using different types of locating in each case. The four locating apparatuses 14a, 24a, 26a, 28a are to some extent of integral design with the appliance electronics unit 56a.

The first locating apparatus 14a is provided for the purpose of performing radar locating. To this end, the first locating apparatus 14a has at least one locating antenna. The first locating apparatus 14a emits a locating signal and receives a portion of the locating signal that is reflected from the locatable objects 16a, 18a, 20a. From the received portion of the locating signal, the computation unit 12a determines an interval between the locating apparatus 14a and the locatable objects 16a, 18a, 20a. To this end, the locating apparatus 14a evaluates a propagation time for the locating signal and/or a phase shift between the transmitted locating signal and the received locating signal. Alternatively, the locating apparatus 14a could determine just one position in a direction parallel to a surface of the workpiece 57a. The first locating apparatus 14a locates in a first locating subregion 38a, a second locating subregion 40a, a third locating subregion 42a and into locating subregions—not situated at the sectional level shown—of the first locating region 22a separately in a manner that appears useful to a person skilled in the art. Hence, the first locating apparatus 14a determines a first locating result that has information about an interval from the locatable objects 16a, 18a, 20a to the locating apparatus 14a and a piece of information about which of the locating subregions 38a, 40a, 42a contains the locatable objects 16a, 18a, 20a.

The second locating apparatus 24a is provided for the purpose of performing inductive locating in a second locating region 30a. To this end, the second locating apparatus 24a has four locating means that are in the form of coils. The locating means are arranged on four different sides of the first locating apparatus 14a. The second locating apparatus 14a produces magnetic fields that are influenced by ferromagnetic locatable objects 16a, in this case an iron bar, during a locating operation. Furthermore, eddy currents arising in electrically conductive locatable objects 20a influence the magnetic field. The computation unit 12a is provided for the purpose of distinguishing a locating signal that is reflected by a ferromagnetic locatable object 16a and a locating signal that is reflected by a non-ferromagnetic, electrically conductive locatable object 20a. The locating apparatus 14a determines influencing of the magnetic field and from the latter, in a manner that appears useful to a person skilled in the art, a second piece of location information for the locatable object 16a. Furthermore, the second locating apparatus 24a locates in four locating subregions 44a, 46a of the second locating region 30a, two of which are shown, separately. In this case, each locating means has one of the locating subregions 44a, 46a associated with it. Hence, the second locating apparatus 24a determines a second locating result that has information about a presence of ferromagnetically locatable objects 16a in the individual locating subregions 44a, 46a of the second locating region 30a.

The third locating apparatus 26a is provided for the purpose of performing AC voltage locating in a third locating region 32a. To this end, the third locating apparatus 26a is to some extent of integral design with the second locating apparatus 24a. The third locating apparatus 26a uses the measuring means of the second locating apparatus 24a to receive an electrical field that emanates from a live locatable object 20a. The locating region 32a of the third locating apparatus 26a is not divided into locating subregions. Alternatively, a locating region of a locating apparatus that locates by induction can have a plurality of locating subregions. The third locating apparatus 26a therefore determines a locating result that has information about a presence of a live locatable object 20a in the third locating region 32a.

The fourth locating apparatus 28a is provided for the purpose of performing capacitive locating in a fourth locating region 34a. To this end, the fourth locating apparatus 28a comprises a measurement pickup that is to some extent of integral design with the locating antenna of the first locating apparatus 14a. The fourth locating apparatus 28a produces electrical alternating fields that are used to measure a capacitance of the measurement pickup. In this case, a frequency is much lower than in the case of radar locating. Locatable objects 16a, 18a, 20a arranged in the fourth locating region 34a alter a capacitance of the measurement pickup. The locating apparatus 28a senses a change in the capacitance of the measurement pickup. The fourth locating apparatus 28a therefore determines a locating result that has information about a presence of a locatable object 20a in the locating region 34a.

The computation unit 12a is provided for the purpose of determining locating information 36a for the locatable objects 16a, 18a, 20a on the basis of locating results from a plurality of the locating apparatuses 14a, 24a, 26a, 28a. In the example shown in FIG. 2, the locating apparatuses 14a, 24a, 26a, 28a ascertain that the first locatable object 16a is arranged inside the first locating region 22a, inside the second locating region 30a and outside the fourth locating region 34a. In addition, the first locating apparatus 14a senses that the first locatable object 16a is arranged inside the first locating subregion 38a of the first locating region 22a. Furthermore, the second locating apparatus 24a senses that the first locatable object 16a is arranged inside the first locating subregion 44a of the second locating region 30a. The computation unit narrows down a region that contains the first locatable object 16 in accordance with the locating result and the associated locating regions 22a, 30a, 32a, 34a. In this case, the first locatable object 6a is arranged outside the fourth locating region 34a and inside a sectional region of the first locating subregion 38a of the first locating region 22a and of the first locating subregion 44a of the second locating region 30a. The thus ascertained locating information 36a of the first locatable object 16a is presented to the operator on the display unit 52a by the computation unit 12a.

The computation unit 12a is provided for the purpose of determining profile information 48a for the locatable objects 16a, 18a, 20a on the basis of locating results from all the locating apparatuses 14a, 24a, 26a, 28a. For example, the computation unit 12 identifies that the first locatable object 16a is arranged both in two adjoining locating subregions 40a of the first locating apparatus 14a and at two adjoining locating subregions 46a of the second locating apparatus 24a.

The computation unit 12a is provided for the purpose of determining property information 47a for the locatable objects 16a, 18a, 20a on the basis of locating results from a plurality of, particularly all the, locating apparatuses 14a, 24a, 26a, 28a. The third locating apparatus 26a ascertains that its locating region 32a contains a live locatable object 20a. The second locating apparatus 24a ascertains a presence of a ferromagnetic, metallic locatable object 16a. The first locating apparatus 24a ascertains a presence of two metallic locatable objects 16a, 20a. The computation unit 12a assigns zero voltage to the ferromagnetic locatable object 16a and an AC voltage to the non-ferromagnetic, metallic locatable object 20a. The computation unit 12a indicates to the operator that the non-ferromagnetic metallic locatable object 20a has an AC voltage. Normally, locatable objects 20a that are in the form of power cables exhibit copper. Since ferromagnetic locatable objects 20a, in this case reinforcing ironwork, can also transport a voltage, however, the computation unit 12a displays a warning symbol 58a to the operator.

The computation unit 12a identifies two separate locatable objects 16a, 18a, 20a when two locatable objects have a locating subregion of one of the locating apparatuses 14a, 24a, 26a, 28a situated between them in which no locatable object is located. Furthermore, the computation unit 12a identifies two separate locatable objects 16a, 18a, 20a when the locating apparatuses 14a, 24a, 26a, 28a determine different material properties of the locatable objects 16a, 18a, 20a.

The computation unit 12a is provided for the purpose of determining plausibility information on the basis of locating results from a plurality of, particularly all the, locating apparatuses 14a, 24a, 26a, 28a. If the first locating apparatus 14a senses a locatable object 18a in a region, the computation unit 12a checks if the second locating apparatus 24a likewise senses a locatable object 18a in this region. In one mode of operation, the computation unit 12a indicates the locatable object 18a only if both locating apparatuses 14a, 24a sense the locatable object 18a. In another mode of operation, the computation unit 12a indicates the locatable object 18a when only one of the locating apparatuses 14a, 24a senses the locatable object 18a. In this case, the computation unit 12a considers whether the locating apparatuses 14a 24a, 26a, 28a are suitable for sensing the locatable object 16a, 18a, 20a. For example, a nonmetallic locatable object 18a can be sensed only by the first locating apparatus 14a and the fourth locating apparatus 28a.

The computation unit 12a is provided for the purpose of weighting at least the locating results from the locating apparatuses 14a, 24a, 26a, 28a differently. In this case, one of the locating apparatuses 14a, 24a, 26a, 28a that appears useful to a person skilled in the art is provided with the highest weighting with an extremely high reliability, particularly on the basis of a property of the locatable object 16a, 18a, 20a. A locatable object 16a, 18a, 20a that is located by this locating apparatus 14a, 24a, 26a, 28a is indicated even if at least one of the other locating apparatuses 14a, 24a, 26a, 28a does not locate the locatable object 16a, 18a, 20a. Preferably, the computation unit 12a assigns a reliability index to the locating results on the locating apparatuses 14a, 24a, 26a, 28a. In this case, the computation unit 12a assigns a reliability index between 0% and 100% to the locating apparatuses 14a, 24a, 26a, 28a on the basis of the property of the locatable object 16a, 18a, 20a. The computation unit 12a indicates a locatable object 16a, 18a, 20a to the operator via the display unit 52a if a sum of the reliability indexes of the locating apparatuses 14a, 24a, 26a, 28a that locate the locatable object 16a, 18a, 20a reaches at least 50%.

The computation unit 12a has operating routines for various modes of operation. In a first mode of operation, the locating results from the locating apparatuses 14a, 24a, 26a, 28a have an equal weighting on the basis of the property of the locatable object 16a, 18a, 20a. The first locating apparatus 14a and the fourth locating apparatus 28a locate a locatable object 16a, 18a, 20a essentially regardless of its properties. The second locating apparatus 24a locates locatable objects 16a made of ferromagnetic and other metals. The third locating apparatus 26a locates locatable objects 20a that are in the form of live conductors. The computation unit 12a assigns a reliability index of 50% to each of the first locating apparatus 14a and the fourth locating apparatus 28a so long as the third locating apparatus 24a and the fourth locating apparatus 26a do not locate a locatable object. If the second locating apparatus 24a or the third locating apparatus 26a locates a locatable object 16a, 20a, the computation unit 12a of this locating apparatus 24a, 26a assigns a reliability index of 33% to each of the first locating apparatus 14a and the fourth locating apparatus 28a. In this case, the computation unit 12a outputs the locating of the locatable object 16a, 20a to the operator if two of the locating apparatuses 14a, 24a, 26a, 28a sense the locatable object 16a, 20a. If the second locating apparatus 24a and the third locating apparatus 26a locate a locatable object 16a, 20a, the computation unit assigns a reliability index of 24% to each of the locating apparatuses 14a, 24a, 26a, 28a. In this case, the computation unit 12a outputs the locating of the locatable object 16a, 20a to the operator if three of the locating apparatuses 14a, 24a, 26a, 28a sense the locatable object 16a, 20a.

A second mode of operation of the computation unit 12a allows advantageous locating of locatable objects 18a made of wood. The computation unit 12a assigns a reliability index of less than 50%, for example 49%, to the first locating apparatus 14a and a reliability index of 50% to the fourth locating apparatus 28a, which allows incorrect indications as a result of faults in the first locating apparatus 14a to be advantageously avoided. Hence, a locatable object that is located only by the first locating apparatus 14a is not indicated. The computation unit 12a assigns a reliability index of 0% to the locating apparatuses 24, 26a for which a sought locatable object 18a is unlocatable, in this case the second locating apparatus 24a and the third locating apparatus 26a. The computation unit 12a indicates the locatable object 18a to the operator if the fourth locating apparatus 28a or the first and fourth locating apparatuses 14a, 28a have located the locatable objects 18a. Furthermore, the computation unit uses the first locating apparatus 14a to determine the locating information 36a for the locatable object 18a inside the locating region 34a of the fourth locating apparatus 28a.

A third mode of operation of the computation unit 12a allows advantageous locating of locatable objects 18a from live locatable objects 20a. The computation unit 12a assigns a reliability index of 50% to the third locating apparatus 26a. Hence, each live locatable object 20a in the locating region 32a is indicated. The computation unit 12a uses the first, the second and the fourth locating apparatus 14a, 24a, 28a to determine a position for the live locatable object 20a. The computation unit 12a assigns a location determination reliability index to each of the locating apparatuses 14a, 24a, 28a that have at least two locating subregions 38a, 40a, 42a, 44a, 46a. In this case, the computation unit 12a assigns a location determination reliability index of 33% to each of these locating apparatuses 14a, 24a, 28a. Hence, the computation unit 12a outputs a piece of location information 36a only if two of the locating apparatuses 14a, 24a, 28a can consistently narrow down a position for the locatable object 20a in one region.

A fourth mode of operation of the computation unit 12a allows advantageous locating of locatable objects 18a that exhibit ferromagnetic material. The computation unit 12a assigns a reliability index of 50% to the second locating apparatus 24a when locating ferromagnetic material. The computation unit 12a uses the first and fourth locating apparatuses 14a, 28a to narrow down the locating information 36a.

The computation unit 12a is therefore provided for the purpose of performing different weightings for the locating results from the locating apparatuses 14a, 24a, 26a, 28a in different modes of operation. The display unit 52a displays location information 36a, property information 47a, profile information 48a and other information that appears useful to a person skilled in the art to the operator during a locating operation. The computation unit 12a is provided for the purpose of using the display unit 52a to indicate the information ascertained by locating on the basis of the selected mode of operation.

In a further embodiment—not shown here—the hand-held locating appliance 10a has motion sensors that sense appliance motion by the hand-held locating appliance 10a, particularly relative to the locatable objects 16a, 18a, 20a. The motion sensors have rollers and a sensor means that senses rotary motion by the rollers. Alternatively or in addition, a hand-held locating appliance could have an optical sensor and/or an acceleration sensor. The computation unit 12a stores the locating results from the locating apparatuses 14a, 24a, 26a, 28a on the basis of the appliance motion. The computation unit 12a interprets the locating results stored with the appliance motion in a manner that appears useful to a person skilled in the art.

Figure 3:
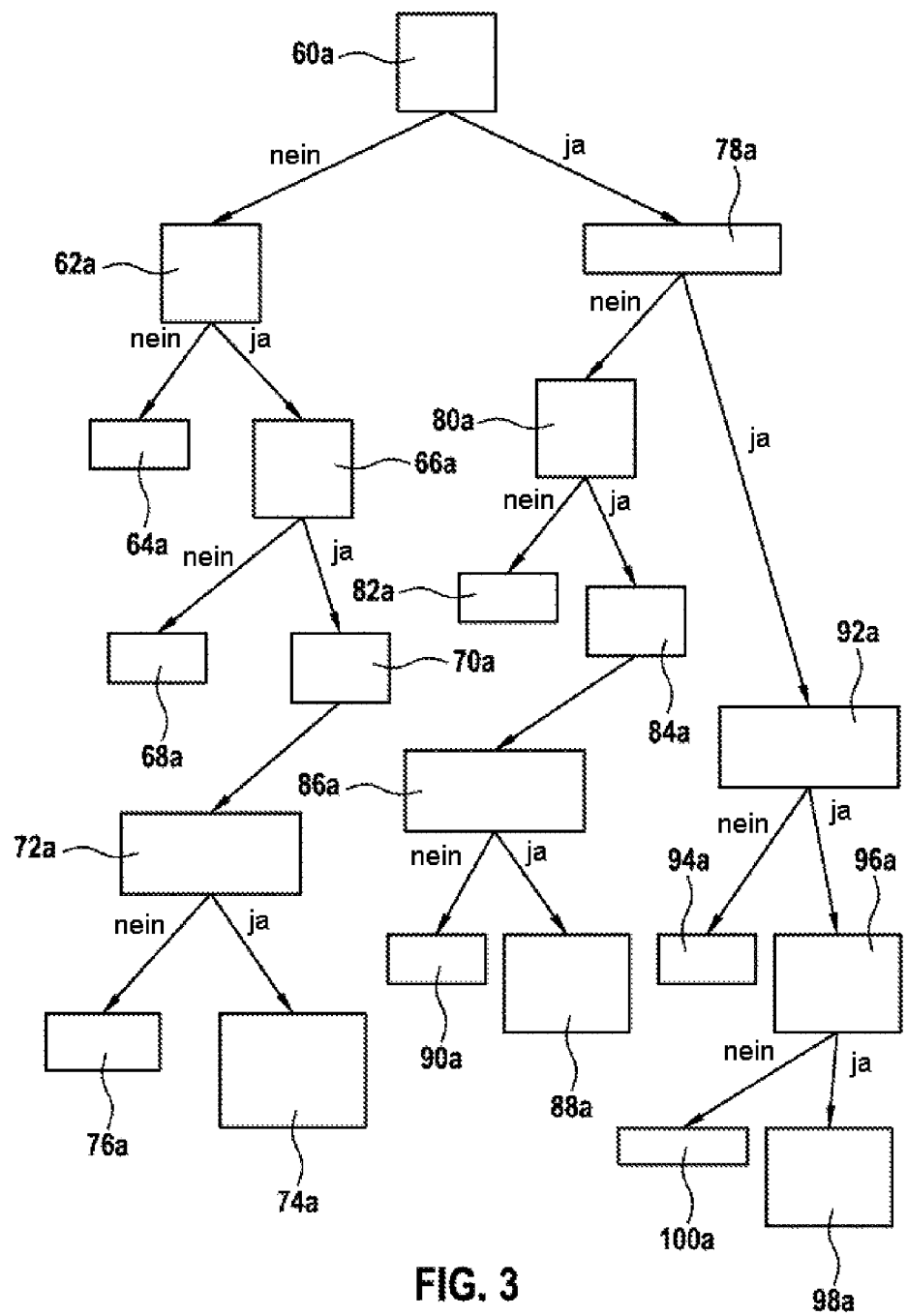
FIG. 3 shows a method with the hand-held locating appliance from FIG. 1.

FIG. 3 shows a method that logically combines the locating results from the locating apparatuses 14a, 24a, 26a, 28a. In a method step 60a, the computation unit 12a ascertains whether the first locating apparatus 14a has located a locatable object 16a, 18a, 20a. If the first locating apparatus 14a has not located a locatable object, the computation unit 12a ascertains in a next method step 62a whether another of the locating apparatuses 24a, 26a, 28a has located a locatable object 16a, 18a, 20a. If none of the other locating apparatuses 24a, 26a, 28a has located a locatable object 16a, 18a, 20a, the computation unit 12a uses the display unit 52a to output, in a further method step 64a, to the operator that no locatable object has been found. If at least one of the other locating apparatuses 24a, 26a, 28a has located a locatable object 16a, 18a, 20a, the computation unit 12a checks the reliability index of this locating apparatus 24a, 26a, 28a or these locating apparatuses 24a, 26a, 28a in a selected mode of operation in a method step 66a. If the reliability index of this locating apparatus 24a, 26a, 28a or these locating apparatuses 24a, 26a, 28a together is below 50%, the computation unit 12a uses the display unit 52a to indicate to the operator, in a method step 68a, that no locatable object 16a, 18a, 20a has been found. If the reliability index of this locating apparatus 24a, 26a, 28a or these locating apparatuses 24a, 26a, 28a together is at least 50%, the computation unit 12a uses the display unit 52a to indicate to the operator, in a method step 70a, that a locatable object 16a, 18a, 20a has been found. In a further method step 72a, the computation unit 12a determines whether locating information 36a from one of the locating apparatuses 14a, 24a, 26a, 28a is available. Furthermore, the computation unit 12a determines whether the locating information 36a has a location determination reliability index of at least 50% in total. If so, the computation unit 12a uses the display unit 52a to indicate the locating information 36a to the operator in a method step 74a. If not, the computation unit 12a uses the display unit 52a to indicate no locating information 36a to the operator in a method step 76a.

If the first locating apparatus 14a has located a locatable object 16a, 18a, 20a, the computation unit 12a ascertains in a next method step 78a whether one of the other locating apparatuses 24a, 26a, 28a has found a locatable object 16a, 18a, 20a. If none of the other locating apparatuses 24a, 26a, 28a has found a locatable object 16a, 18a, 20a, the computation unit 12a checks in a further method step 80a whether the first locating apparatus 14a has a reliability index of at least 50% in a selected mode of operation. If the locating apparatus 14a has a reliability index of less than 50%, the computation unit 12a uses the display unit 52a to indicate no locating of a locatable object 16a, 18a, 20a in a method step 82a. If the first locating apparatus 14a has a reliability index of at least 50%, the computation unit 12a uses the display unit 52a to indicate a presence of a locatable object 16a, 18a, 20a in a method step 84a. In a further method step 86a, the computation unit 12a determines whether locating information 36a from one of the locating apparatuses 14a, 24a, 26a, 28a is available. Furthermore, the computation unit 12a determines whether the locating information 36a has a location determination reliability index of at least 50% in total. If so, the computation unit 12a uses the display unit 52a to indicate the location information 36a to the operator in a method step 88a. If not, the computation unit 12a does not use the display unit 52a to indicate the locating information 36a to the operator in a method step 90a.

If one of other locating apparatuses 24a, 26a, 28a has found a locatable object 16a, 18a, 20a, the computation unit 12a checks in a further method step 92a whether locating information 36a from one of the locating apparatuses 14a, 24a, 26a, 28a is available. If no locating information 36a is available, the computation unit 12a uses the display unit 52a to indicate to the operator, in a method step 94a, only the presence of a locatable object 16a, 18a, 20a. If a piece of locating information 36a is available, the computation unit 12a checks a location determination reliability index of the locating apparatuses 14a, 24a, 26a, 28a in a method step 96a. Furthermore, the computation unit 12a checks whether the pieces of location information 36a match. If, furthermore, a location determination reliability index of at least 50% is being reached and the pieces of location information 36a match, the computation unit 12a uses the display unit 52a to indicate the location information 36a for the locatable object 16a, 18a, 20a in a method step 98a. Otherwise, the computation unit 12a uses the display unit 52a to indicate only the presence of a locatable object 16a, 18a, 20a in a method step 100a.

Furthermore, the computation unit 12a determines the property information 47a of the locatable object 16a, 18a, 20a from the locating results from the locating apparatuses 14a, 24a, 26a, 28a. The computation unit weights the locating results from the locating apparatuses 14a, 24a, 26a, 28a in respect of the property information 47a. Furthermore, the computation unit 12a checks whether the property information 47a can have corresponding location information 36a for the locatable objects 16a, 18a, 20a associated with it. Furthermore, the computation unit 12a determines a piece of plausibility information for each locatable object. The computation unit 12a ascertains whether the property information 47a is consistent. For example, the computation unit 12a identifies if a nonmetallic locatable object is meant to have a voltage. In this case, the computation unit 12a outputs a warning that informs the operator that an unassociated voltage in the locating region 32a of the third locating apparatus 26a or associated has been measured.

Figure 4:
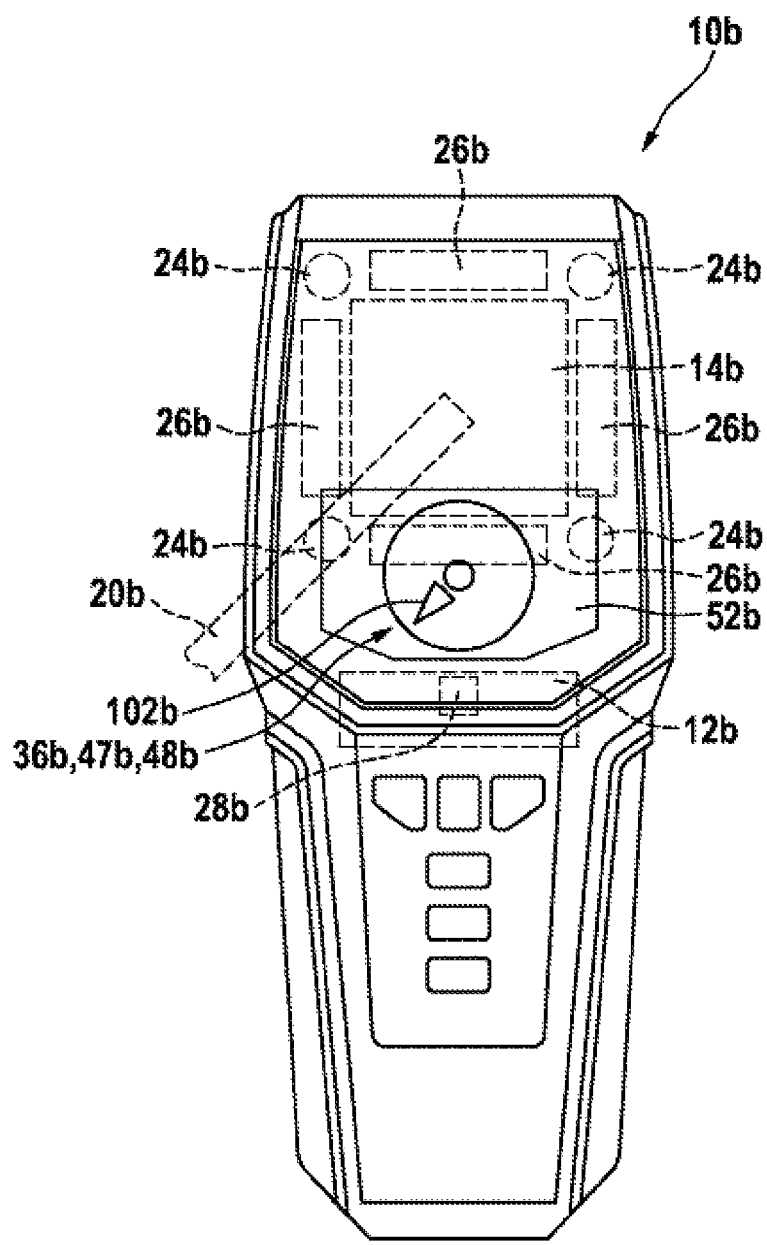
FIG. 4 shows an alternative exemplary embodiment of the hand-held locating appliance from FIG. 1.
Figure 5:
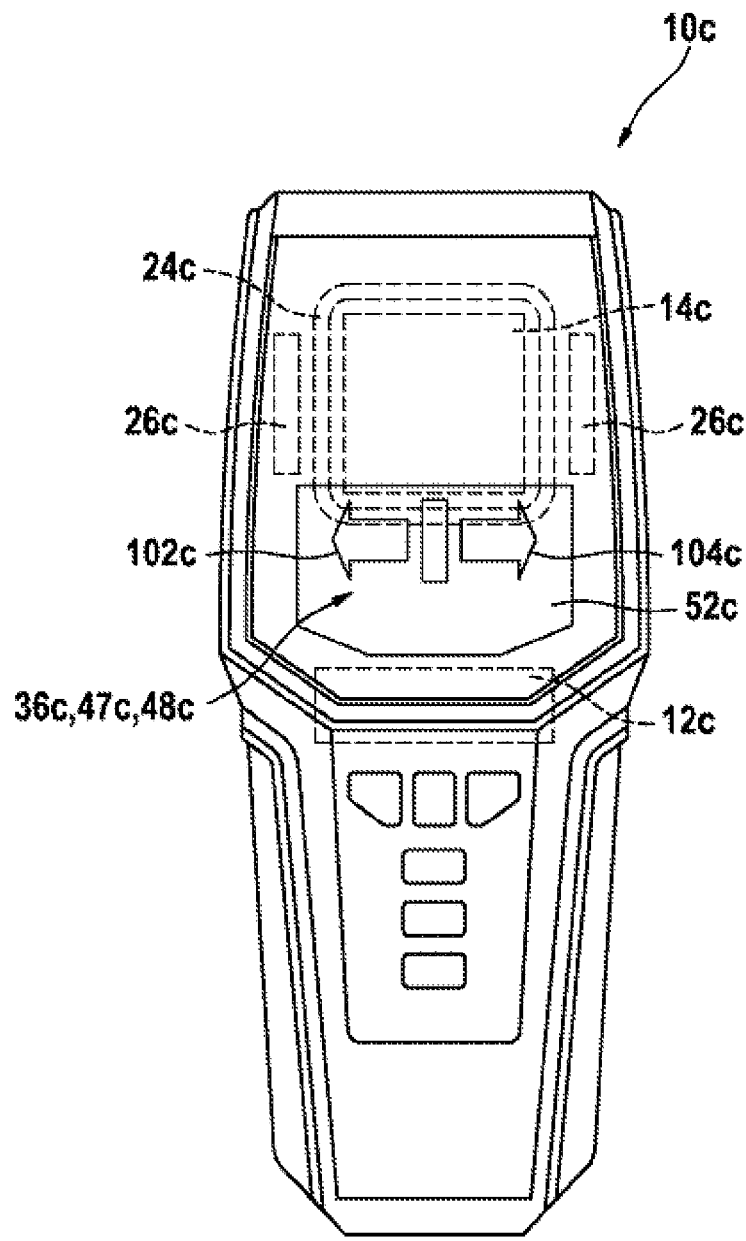
FIG. 5 shows a further alternative exemplary embodiment of the hand-held locating appliance from FIG. 1.
Figure 6:
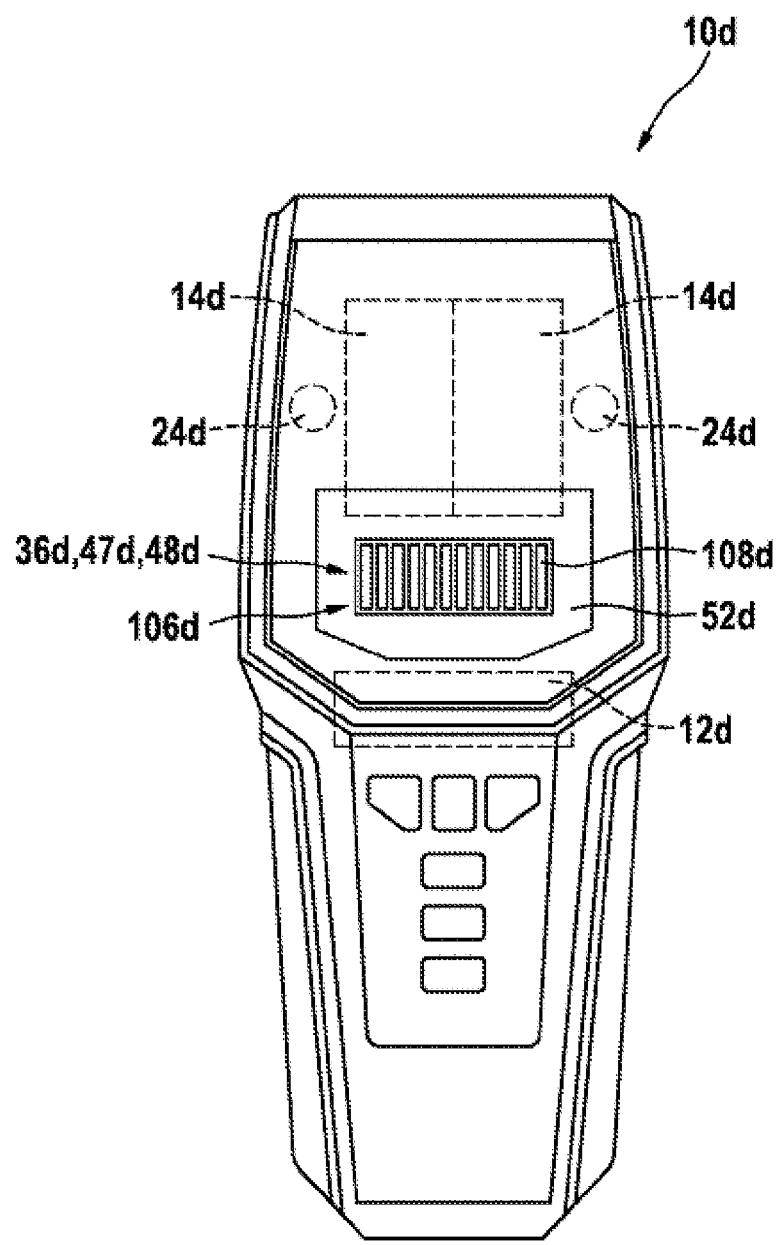
FIG. 6 shows a fourth exemplary embodiment of the hand-held locating appliance from FIG. 1.

FIGS. 4 to 6 show three further exemplary embodiments of the disclosure. The descriptions below and the drawings are limited essentially to the differences between the exemplary embodiments, and in respect of parts having the same designations, particularly in respect of parts having the same reference symbols, it is also possible, in principle, to refer to the drawings and/or the description of the other exemplary embodiments, particularly of the FIGS. 1 to 3. To distinguish between the exemplary embodiments, the letter a is suffixed to the reference symbols of the exemplary embodiment in FIGS. 1 to 3. In the exemplary embodiments in FIGS. 4 to 6, the letter a is replaced by the letters b to d.

FIG. 4 shows a hand-held locating appliance 10b with a computation unit 12b, with a first locating apparatus 14b, with a second locating apparatus 24b, with a third locating apparatus 26b and with a fourth locating apparatus 28b. The locating apparatuses 14b, 24b, 26b, 28b are provided for the purpose of locating locatable objects 20b in locating regions of the locating apparatuses 14b, 24b, 26b, 28b. The locating regions—not shown in more detail in this case—of the locating apparatuses 14b, 24b, 26b, 28b are each different to some extent. Furthermore, the hand-held locating appliance 10b has a display unit 52b. The display unit 52b displays location information 36b, property information 47b, profile information 48b and/or other information that appears useful to a person skilled in the art to the operator during a locating operation.

The computation unit 12b is provided for the purpose of using the display unit 52b to present the information ascertained by locating on the basis of a selected mode of operation. In addition, the computation unit 12b is provided for the purpose of presenting a piece of property information 47b for a locatable object 20b arranged in a center of the locating region in a center of a presentation region of the display unit 52b. Furthermore, the computation unit 12b is provided for the purpose of presenting a piece of profile information 48b for the locatable object 20b as an arrow 102b emanating from the center of the presentation region of the display unit 52b.

The first locating apparatus 14b is provided for the purpose of performing radar locating. To this end, the first locating apparatus 14b has at least one locating antenna. The second locating apparatus 24b is provided for the purpose of performing inductive locating. To this end, the second locating apparatus 24b has four locating means that are in the form of coils. The locating means are arranged at four different corners of the first locating apparatus 14b. The third locating apparatus 26b is provided for the purpose of performing AC voltage locating. The third locating apparatus 26b is produced separately from the second locating apparatus. The fourth locating apparatus 28b is provided for the purpose of performing capacitive locating. To this end, the fourth locating apparatus 28b comprises four measurement pickups. The measurement pickups are in the form of conductive surfaces. The fourth locating apparatus 28b is produced separately from the first locating apparatus 14b.

FIG. 5 shows a hand-held locating appliance 10c with a computation unit 12c, with a first locating apparatus 14c, with a second locating apparatus 24c and with a third locating apparatus 26c. The locating apparatuses 14c, 24c, 26c are provided for the purpose of locating locatable objects in locating regions of the locating apparatuses 14c, 24c, 26c. The locating regions—not shown in more detail in this case—of the locating apparatuses 14c, 24c, 26c are each different to some extent. Furthermore, the hand-held locating appliance 10c has a display unit 52c. The display unit 52c displays location information 36c, property information 47c and/or other information that appears useful to a person skilled in the art to the operator during a locating operation. The computation unit 12c is provided for the purpose of using the display unit 52c to present the information ascertained by locating on the basis of a selected mode of operation. The computation unit 12c is provided for the purpose of presenting a piece of property information 47c as a color. Alternatively or in addition, a hand-held locating appliance could output a piece of property information and/or another piece of information that appears useful to a person skilled in the art as a tone and/or as a tone sequence at one or more frequencies or volumes. Furthermore, the computation unit 12c is provided for the purpose of presenting a piece of locating information 36c for the locatable object 20c.

The first locating apparatus 14c is provided for the purpose of performing radar locating. To this end, the first locating apparatus 14c has at least one locating antenna. The second locating apparatus 24c is provided for the purpose of performing inductive locating. To this end, the second locating apparatus 24c has a locating means that is in the form of a coil. The locating means surrounds the first locating apparatus 14c at one level. The third locating apparatus 26c is provided for the purpose of performing capacitive locating. To this end, the third locating apparatus 26c comprises two measurement pickups. The measurement pickups are in the form of conductive surfaces. The measurement pickups are arranged on opposite sides of the first locating apparatus 14c. The computation unit is provided for the purpose of using the display unit 52c to indicate to the operator whether a locatable object is arranged centrally or eccentrically or centrally and eccentrically. To this end, the computation unit 12c evaluates locating results from at least the first locating apparatus 14c and the third locating apparatus 26c and calculates a piece of locating information 36c and a piece of profile information 48c. If a locatable object is arranged eccentrically, the computation unit 12c uses the display unit 52c to present this in the form of arrows 102c, 104c.

FIG. 6 shows a hand-held locating appliance 10d with a computation unit 12d, with a first locating apparatus 14d and with a second locating apparatus 24d. The locating apparatuses 14d, 24d are provided for the purpose of locating locatable objects in locating regions—not shown in more detail in this case—of the locating apparatuses 14d, 24d. The locating regions of the locating apparatuses 14d, 24d are each different to some extent. Furthermore, the hand-held locating appliance 10d has a display unit 52d. The display unit 52d displays location information 36d, property information 47d and/or other information that appears useful to a person skilled in the art to the operator during a locating operation. The computation unit 12d is provided for the purpose of using the display unit 52d to present the information ascertained by locating on the basis of a selected mode of operation. The computation unit 12d is provided for the purpose of presenting a piece of property information 47d as a color. Furthermore, the computation unit 12d is provided for the purpose of presenting a piece of location information 36d—sensed by the locating apparatuses 14d, 24d—for the locatable object 20d on a scale 106d. Bars 108d of the scale 106d are associated with distances from the locatable object to a centrally arranged locatable object.

The first locating apparatus 14d is provided for the purpose of performing capacitive locating. To this end, the first locating apparatus 14d has two measurement pickups. The measurement pickups are in the form of conductive surfaces. The second locating apparatus 24d is provided for the purpose of performing inductive locating. To this end, the second locating apparatus 24d has two locating means that are in the form of coils. The locating means surround the first locating apparatus 14d at one level. The locating means are arranged on opposite sides of the first locating apparatus 14d.

The invention claimed is:

1. A hand-held locating appliance for locating locatable objects comprising:
a computation unit that includes:
a first locating apparatus configured to locate at least one locatable object in a first locating region; and
a second locating apparatus configured to locate at least one locatable object in a second locating region,
wherein the first locating region is different from the second locating region, and
wherein the computation unit is configured to determine at least one piece of locating information for at least one locatable object of the locatable objects based at least in part upon a first locating result from the first locating apparatus and a second locating result from the second locating apparatus.

2. The hand-held locating appliance of claim 1, wherein the first locating apparatus is configured to separately locate in a first locating subregion and a second locating subregion of the first locating region.

3. The hand-held locating appliance of claim 2, wherein the second locating apparatus is configured to separately locate in a first locating subregion and a second locating subregion of the second locating region.

4. The hand-held locating appliance of claim 1, wherein the computation unit is further configured to output a presence of at least one locatable object of the locatable objects in one operating state only if the first locating apparatus and the second locating apparatus each sense at least one locatable object of the locatable objects.

5. The hand-held locating appliance of claim 1, wherein the computation unit is further configured to output the at least one piece of locating information for at least one locatable object of the locatable objects in one operating state only if the first locating apparatus and the second locating apparatus each sense at least one locatable object of the locatable objects.

6. The hand-held locating appliance of claim 1, wherein the computation unit is further configured to determine at least one piece of profile information for at least one locatable object of the locatable objects based at least in part upon the first locating result from the first locating apparatus and the second locating result from the second locating apparatus.

7. The hand-held locating appliance of claim 1, wherein the first locating apparatus is further configured to locate the at least one locatable object using a first type of locating and the second locating apparatus is further configured to locate the at least one locatable object using a second type of locating, wherein the first type of locating differs from the second type of locating, wherein the first and second type of locating is based on physical principles of the locatable objects.

8. The hand-held locating appliance of claim 7, wherein the computation unit is further configured to determine at least one piece of property information for at least one locatable object of the locatable objects based at least in part upon the first locating result from the first locating apparatus and the second locating result from the second locating apparatus.

9. The hand-held locating appliance at least of claim 7, wherein the computation unit is further configured to determine at least one piece of plausibility information on the basis of the first locating result from the first locating apparatus and the second locating result from the second locating apparatus.

10. The hand-held locating appliance of claim 1, wherein the computation unit is further configured to weigh the first locating result from the first locating apparatus and the second locating result from the second locating apparatus differently.

11. The hand-held locating appliance of claim 10, wherein the computation unit is further configured to perform different weightings in different modes of operation for the first locating result of the first locating apparatus and the second locating result of the second locating apparatus.

12. A method of locating locatable objects with a hand-held locating appliance having a computation unit, comprising:
locating with a first locating apparatus at least one locatable object in a first locating region in at least one operating state;
locating with a second locating apparatus at least one locatable object in a second locating region in the at least one operating state; and
determining using the computation unit at least one piece of locating information for at least one locatable object of the locatable objects based at least in part upon a first locating result from the first locating apparatus and a second locating result from the second locating apparatus,
wherein the first locating region is different from the second locating region, and
wherein the computational unit includes the first locating apparatus and the second locating apparatus.

* * * * *